US006887179B2

(12) United States Patent
Yamashita et al.

(10) Patent No.: US 6,887,179 B2

(45) Date of Patent: May 3, 2005

(54) PLANETARY GEAR APPARATUS

(75) Inventors: Yozo Yamashita, Higashimatsuyama (JP); Shinichiro Nakajima, Shiki (JP); Makoto Nishiji, Kumagaya (JP)

(73) Assignee: Toyoda Machine Works, Ltd., Kariya (JP)

(*) Notice: Subject to any disclaimer, the term of this patent is extended or adjusted under 35 U.S.C. 154(b) by 57 days.

(21) Appl. No.: 10/660,057

(22) Filed: Sep. 11, 2003

(65) Prior Publication Data

US 2004/0058775 A1 Mar. 25, 2004

(30) Foreign Application Priority Data

Sep. 19, 2002 (JP) ....................................... 2002-273088

(51) Int. Cl.[7] ................................................ F16H 57/08

(52) U.S. Cl. ........................................ 475/338; 475/344

(58) Field of Search ................................ 475/248, 331, 475/338, 344

(56) References Cited

U.S. PATENT DOCUMENTS

2003/0050146 A1 * 3/2003 Nishiji et al. ............... 475/331

* cited by examiner

*Primary Examiner*—Dirk Wright

(74) *Attorney, Agent, or Firm*—Thomas B. Ryan; Brian B. Shaw, Esq.; Harter, Secrest & Emery LLP

(57) ABSTRACT

A carrier 2 is fixed to one end opening part of a circular cylindrical apparatus main body 1. A plurality of receiving holes **2*d*, which extend in parallel with a rotation axis L, are formed in the carrier 2 at the same interval in a peripheral direction. A planetary gear 4 is received in each receiving hole 2*d* such that the planetary gear 4 can rotate on its own axis. An inner gear 5 and a sun gear 9, which are arranged with their axes aligned with the rotation axis L of the apparatus main body 1, are disposed within the apparatus main body 1. The inner gear 5 is engaged with the planetary gears 4 at the outside thereof. The sun gear 9 is engaged with the planetary gears 4 at the inner side thereof. An engagement part between the inner gear 5 and the planetary gear 4 and an engagement part between the sun gear 9 and the planetary gear 4** are displaced from each other in a direction of the rotation axis L so that they are not overlapped with each other in a direction of the rotation axis L.

6 Claims, 12 Drawing Sheets

F I G. 1
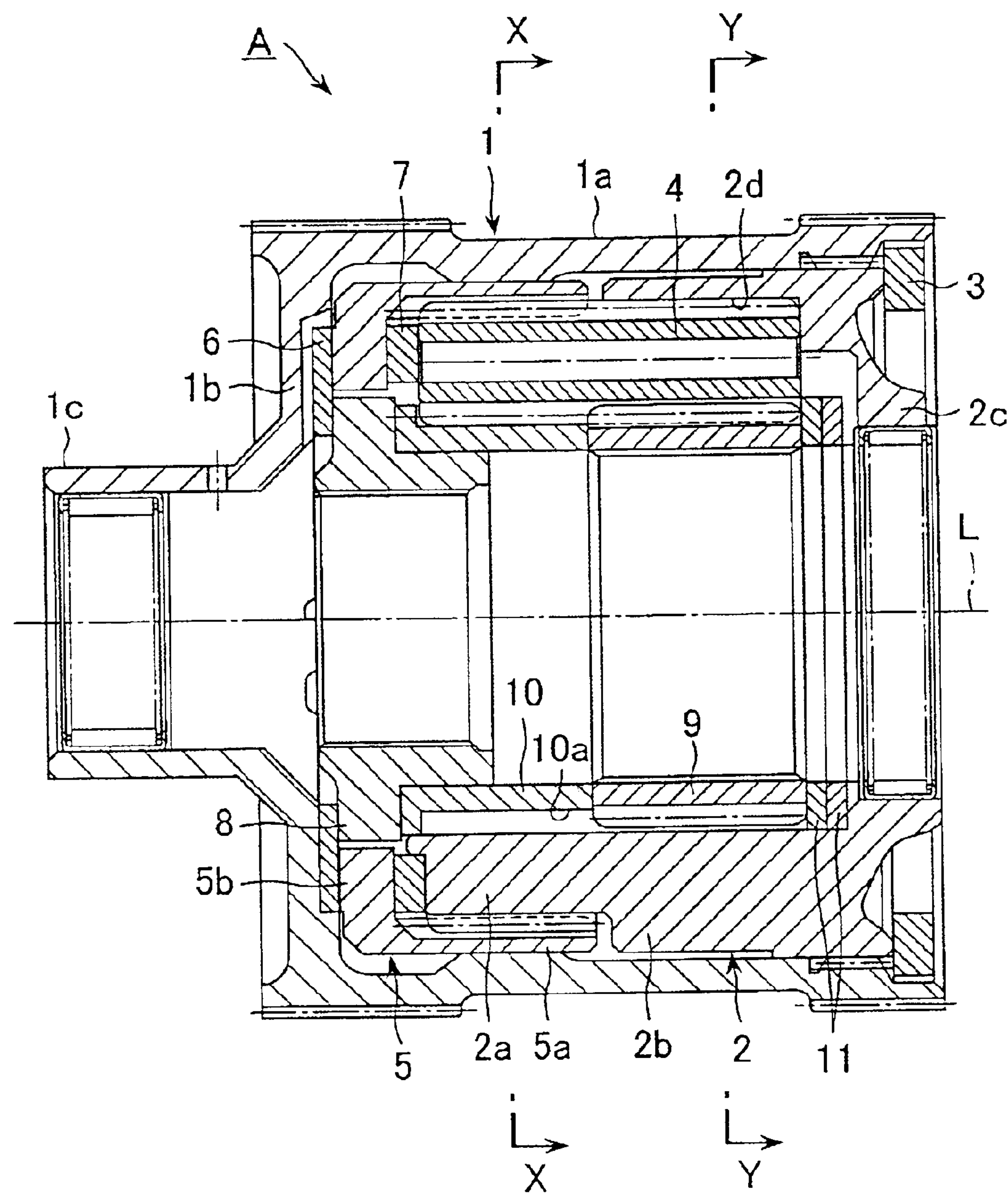

F I G. 3
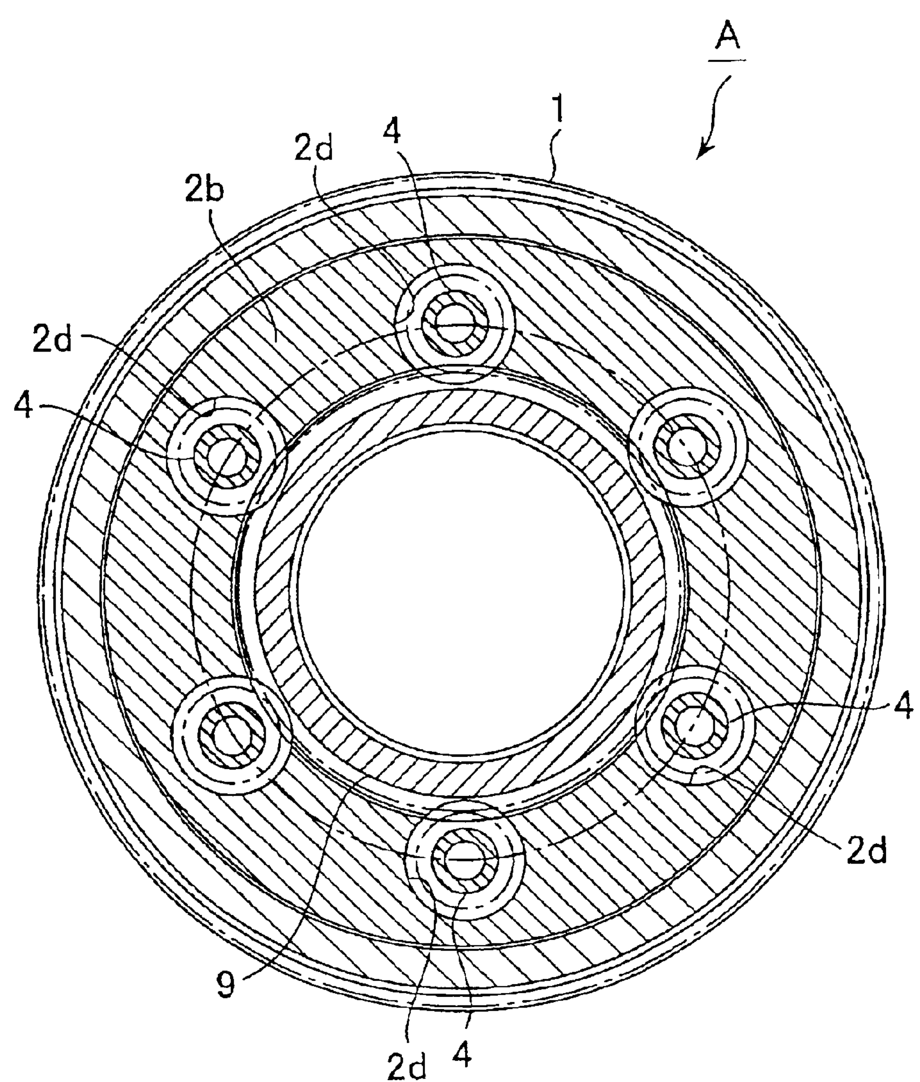

F I G. 4
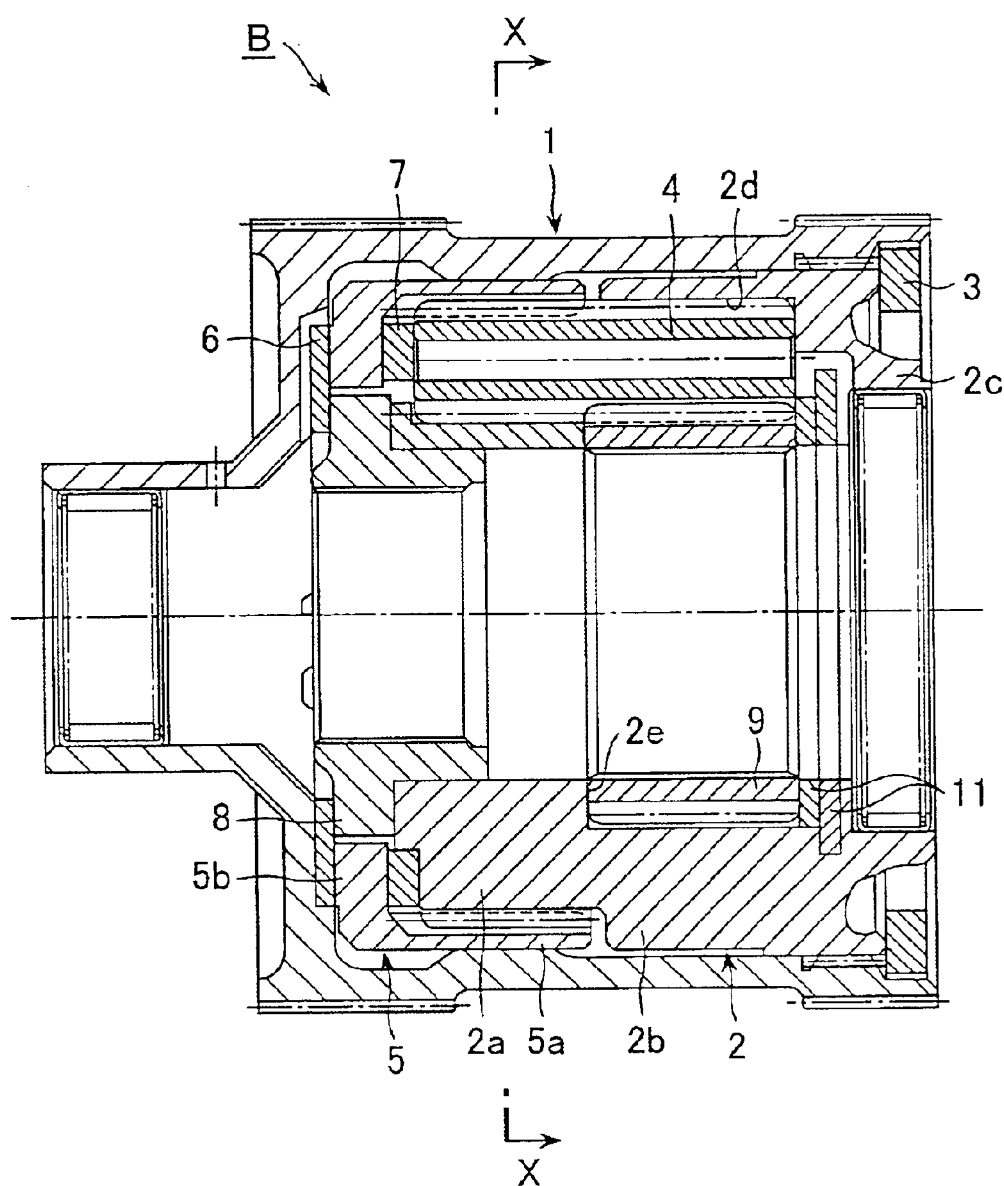

F I G. 6
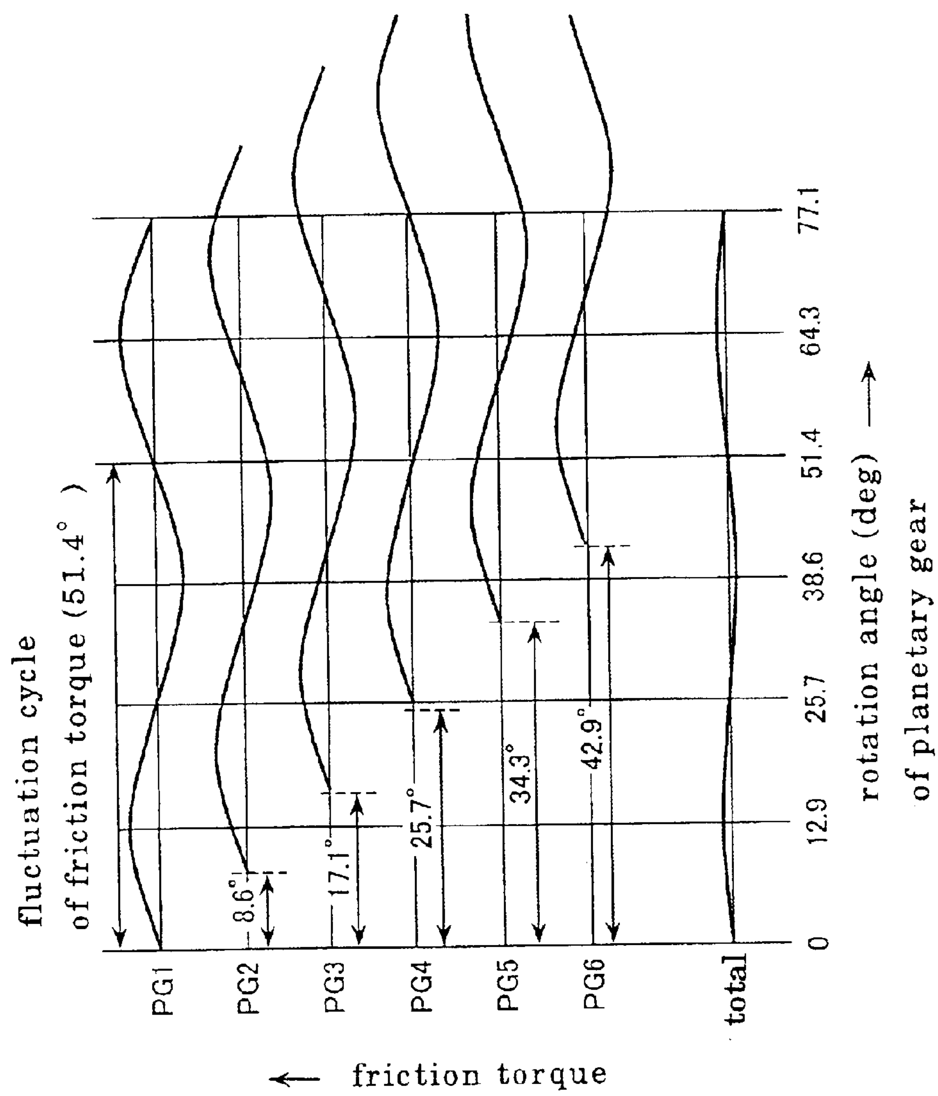

* phase difference (72°) of PG2 with respect to PG1

F I G. 9
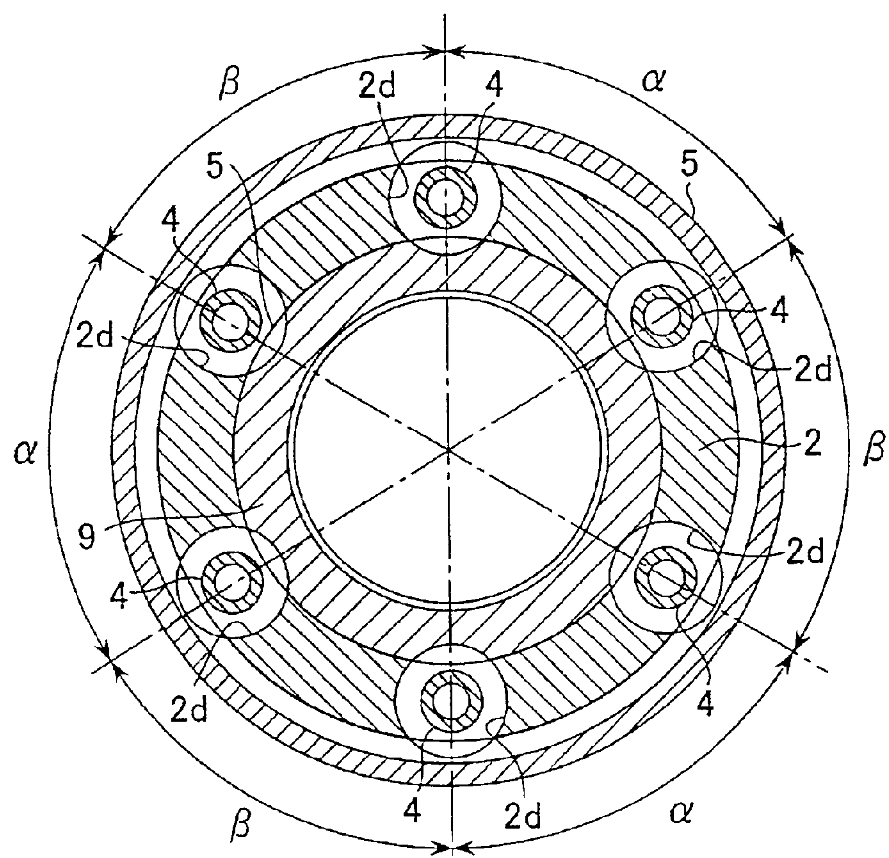

PLANETARY GEAR APPARATUS

BACKGROUND ART

This invention relates to a planetary gear apparatus suited to be used as a differential gear apparatus for vehicles.

In general, a planetary gear apparatus of this type comprises an inner gear and a sun gear rotatably disposed with their axes aligned with the rotation axis, a plurality of planetary gears which are in engagement with the inner gear and the sun gear, and a carrier rotatably disposed with its axis aligned with the rotation axis and adapted to support the planetary gears such that the planetary gears can rotate their own axes. One of the inner gear, sun gear and carrier serves as an input member and the remaining two as an output member. That is, one of the inner gear, sun gear and carrier is driven for rotation and rotation of the remaining two is extracted as an output rotation (for example, Japanese Patent Application Laid-Open Nos. H09-112657 and H09-144844).

In the above-mentioned planetary gear apparatus according to the related art, it is demanded the torque bias ratio as a ratio of the rotation torque which is to be transmitted to the two output members is set to be large. It is, therefore, an object of the present invention to provide a planetary gear apparatus in which the torque bias ratio can be set to be large.

SUMMARY OF THE INVENTION

In order to achieve the above object, the feature of the first embodiment of the present invention (hereinafter referred to as the first invention) resides in a planetary gear apparatus comprising an inner gear and a sun gear which are rotatably arranged with axes thereof aligned with a rotation axis, at least one planetary gear arranged in parallel with the inner gear and sun gear and engaged therewith, and a carrier rotatably arranged with an axis thereof aligned with the rotation axis and formed therein with a receiving hole for rotatably receiving the planetary gear over a generally entire length thereof, an engagement part between the inner gear and the planetary gear are displaced with an engagement part between the sun gear and the planetary gear in a direction of the rotation axis so that the engagement parts are not overlapped with each other.

In this case, it is preferred that the engagement part between the inner gear and the planetary gear and the engagement part between the sun gear and the planetary gear are displaced such that end parts of the engagement parts which are adjacent to each other in a direction of the rotation axis are located nearly at the same position in a direction of the rotation axis.

The first invention preferably further comprises a first supporting part for supporting an outer peripheral surface of the planetary gear corresponding to the engagement part between the inner gear and the planetary gear from an inner side than the planetary gear in a radial direction of the inner gear, and a second supporting part for supporting an outer peripheral surface of the planetary gear corresponding to the engagement part between the sun gear and the planetary gear from an outer side than the planetary gear in a radial direction of the sun gear.

It is preferred that the inner gear, the sun gear and the planetary gear each have helical teeth, a plurality of the planetary gears are provided, an engaging phase of the at least one planetary gear with respect to the inner gear and sun gear is different in phase from an engaging phase of another planetary gear with respect to the inner gear and sun gear.

In order to achieve the above object, the feature of the second embodiment of the present invention (hereinafter referred to as the second invention) resides in a planetary gear apparatus comprising an inner gear and a sun gear which are rotatably arranged with axes thereof aligned with a rotation axis, and a plurality of planetary gears engaged with the inner gear and sun gear, the planetary gears are arranged at non-uniform interval in a peripheral direction of the sun gear so that when the planetary gears urge the sun gear in the radial direction by engagement with the sun gear, a resultant force of the urging force acts in one direction in a radial direction of the sun gear, and a sun gear supporting member for supporting an outer peripheral surface of the sun gear is disposed at the outside of the sun gear on a forward side in the one direction.

In order to achieve the above object, the feature of the third embodiment of the present invention (hereinafter referred to as the third invention) resides in a planetary gear apparatus comprising an inner gear and a sun gear which are rotatably arranged with axes thereof aligned with a rotation axis, and a plurality of planetary gears engaged with the inner gear and sun gear, the planetary gears are arranged at non-uniform interval in a peripheral direction of the inner gear so that when the planetary gears urge the inner gear in the radial direction by engagement with the inner gear, a resultant force of the urging force acts in one direction in a radial direction of the inner gear, and an inner gear supporting member for supporting an outer peripheral surface of the inner gear is disposed at the outside of the inner gear on a forward side in the one direction.

BRIEF DESCRIPTION OF THE DRAWINGS

FIG. 1 is a sectional view taken on line X—X of FIG. 2 showing one embodiment of the first invention.

FIG. 3 is a sectional view taken on line Y—Y of FIG. 1.

FIG. 4 is a sectional view, similar to FIG. 1, showing another embodiment of the first invention.

FIG. 6 is a chart showing fluctuation of the friction torque which acts on each planetary gear and of the total friction torque which acts on all of the planetary gears when predetermined conditions are satisfied in the embodiment shown in FIGS. 1 through 3 or in the embodiment shown in FIGS. 4 and 5.

FIG. 9 is a sectional view similar to FIG. 7 when still further predetermined conditions are satisfied in the embodiment of the first invention.

DETAILED DESCRIPTION OF THE INVENTION

Embodiments of the present invention will be described hereinafter with reference to FIGS. 1 through 12.

Figure 2:
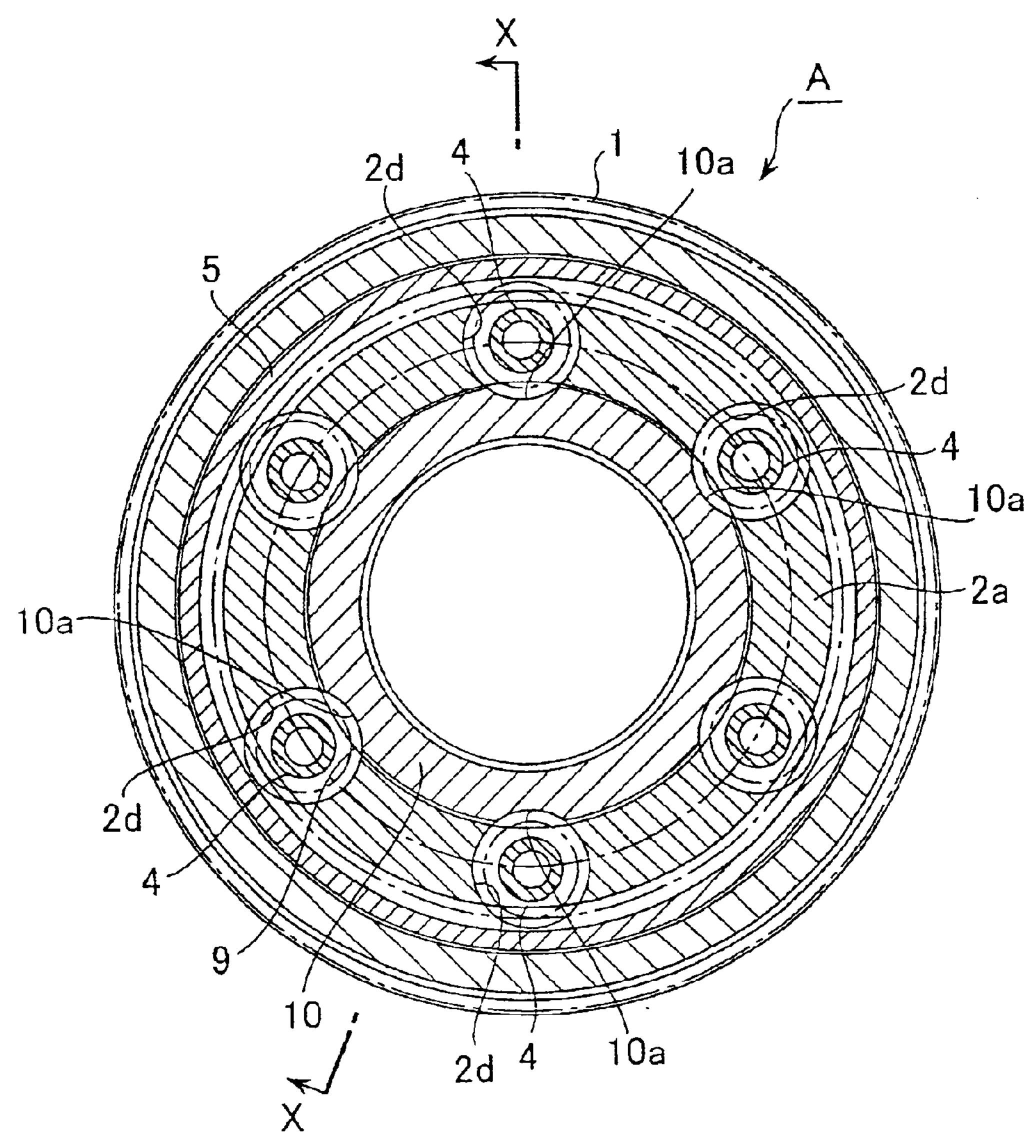
FIG. 2 is a sectional view taken on line X—X of FIG. 1.

FIGS. 1 through 3 show one embodiment of the first invention. A planetary gear apparatus A of this embodiment includes an apparatus main body 1. The apparatus main body 1 includes a circular cylindrical main body part 1*a* which is disposed with its axis aligned with a rotation axis L, and a bottom part 1*b* formed on one end part of the main body part 1*a*. The apparatus main body 1 is driven for rotation about the rotation axis L by an engine (not shown).

A carrier 2 is inserted in the apparatus main body 1 through an opening part thereof. The carrier 2 has a circular cylindrical configuration. The carrier 2 includes a reduced-diameter part 2*a* which is located on the distal end side (left side in FIG. 1) in the direction of insertion, and an enlarged-diameter part 2*b* which is located on the basal end side. The reduced-diameter part 2*a* and the enlarged-diameter part 2*b* are disposed in such a manner that their axes are aligned with each other and also aligned with the rotation axis L. The outside diameter of the reduced-diameter part 2*a* is smaller than the outside diameter of the enlarged-diameter part 2*b* but the inside diameter of the reduced-diameter part 2*a* is equal to the inside diameter of the enlarged-diameter part 2*b*. The outside diameter of the enlarged-diameter part 2*b* is slightly smaller than the inside diameter of the apparatus main body 1 in this embodiment. It is also accepted that the outside diameter of the enlarged-diameter part 2*b* is designed almost equal to the inside diameter of the apparatus main body 1 so that the enlarged-diameter part 2*b* is fitted to the apparatus main body 1 with almost no space formed therebetween. An annular supporting part 2*c* projecting inward in the radial direction of the enlarged-diameter part 2*b* is formed on the basal end part of the inner peripheral surface of the enlarged-diameter part 2*b*. The carrier 2 is in spline engagement at an outer peripheral surface of its basal end part with an opening side end part of the inner peripheral surface of the apparatus main body 1. By this, the carrier 2 is non-rotatably connected to the apparatus main body 1. Moreover, the carrier 2 is non-movably connected to the apparatus main body 1 in the direction of the rotation axis L by tightening a nut 3 which is threadingly engaged with the opening end part of the apparatus main body 1. In other words, the carrier 2 is fixed to the apparatus main body 1.

Receiving holes 2*d* are formed in the carrier 2. Each receiving hole 2*d* extends from the distal end face of the reduced-diameter part 2*a* to a basal end part of the enlarged-diameter part 2*b* in parallel with the rotation axis L. The center line of the receiving hole 2*d* is located at the center between the outer peripheral surface of the reduced-diameter part 2*a* and the inner peripheral surface of the reduced-diameter part 2*a*. Moreover, the inside diameter of the receiving hole 2*d* is set to be larger than the thickness (=(outside diameter of the reduced-diameter part−inside diameter of the reduced-diameter part)/2) of the reduced-diameter part 2. Accordingly, the inner side part of the receiving hole 2*d* in the radial direction of the carrier 2 is open towards the inner side from the inner peripheral surfaces of the reduced-diameter part 2*a* and the enlarged-diameter part 2*b*. On the other hand, the outer side part of the receiving hole 2*d* is open towards the outer side from the outer peripheral surface of the reduced-diameter part 2*a*. However, since the distance from the outer peripheral surface of the enlarged-diameter part 2*b* to the center line of the receiving hole 2*d* is set to be larger than the radius of the receiving hole 2*d*, the outer side part of the receiving hole 2*b* is not open towards the outer side but closed at the enlarged-diameter part 2*b*.

A planetary gear 4 is rotatably (about its own axis) received in the receiving hole 2*d*. The planetary gear 4 has the generally same outside diameter as the receiving hole 2*d*. Accordingly, of the entire outer peripheral surface of the planetary gear 4, the inner side part in the radial direction of the carrier 2 projects over its entire length from the receiving hole 2*d* radially inward of the carrier 2. On the other hand, of the entire outer peripheral surface of the planetary gear 4, the outer side part in the radial direction of the carrier 2 projects to the outside from the reduced-diameter part 2*a* but it does not project to the outside from the enlarged-diameter part 2*b*. That is, a left end part of the planetary gear 4 projects to the outside from the receiving hole 2*d* in the radial direction of the carrier 2, but a right end part thereof does not project to the outside from the receiving hole 2*d*. The right end part of the planetary gear 4 is in contact with the inner peripheral surface of the receiving hole 2*d*.

An inner gear 5 is received in an end part on the bottom part 1*a* side within the apparatus main body 1. This inner gear 5 is rotatably arranged about the rotation axis L with an axis thereof aligned with the rotation axis L. The inner gear 5 includes an inner gear part 5*a*, and an annular connecting part 5*b* integral with an end part on the bottom part 1*b* side of the inner gear part 5*a* and projecting radially inward. The inner gear part 5*a* is arranged on the outer side of the planetary gear 4 in such a manner as to oppose to a left end part of the planetary gear 4. The outer peripheral surface of the inner gear part 5*a* is fitted to the inner peripheral surface of the main body part 1*a* with a small space. However, it is also accepted that the outside diameter of the inner gear part 5*a* is dimensioned generally equal to the inside diameter of the main body part 1*a* so that the outer peripheral surface of the inner gear part 5*a* is fitted to the inner peripheral surface of the main body part 1*a* almost with no space. One end face of the annular connecting part 5*b* in the direction of the rotation axis L is in contact with the bottom part 1*b* through a friction washer 6 and the other end face is in contact with an end face of the planetary gear 4 through a friction washer 7. As a result, the inner gear 5 and planetary gear 4 are almost non-movable in the direction of the rotation axis L. An output member 8 is connected, by means of spline fitting or the like, to the inner peripheral surface of the annular connecting part 5*b* such that the output member 8 is non-rotatably but movable in the direction of the rotation axis L. One end part of a first output shaft (not shown) is non-rotatably connected to the inner periphery of this output member 8. The other end part of the first output shaft rotatably pierces through a bearing part 1*c* which is disposed at the bottom part 1*b* and projects to the outside from the apparatus main body 1 so as to be connected to, for example, one of the left and right wheels of a vehicle or one of the front differential gear or the rear differential gear of a vehicle.

A sun gear 9 is received in an end part on the opening part side within the apparatus main body 1. The sun gear 9 is disposed at the inner side of the planetary gears 4 in such a manner as to oppose to a left end part of each planetary gear 4. Moreover, the sun gear 9 is disposed with an axis thereof aligned with the rotation axis L and rotatable about the rotation axis L. One end face (left end face in FIG. 1) of the sun gear 9 is in contact with the output member 8 through a spacer 10 and further in contact with the bottom part 1*b* through the friction washer 6. The other end face of the sun gear 9 is in contact with the supporting part 2*c* of the carrier 2 through friction washers 11, 11. Owing to this arrangement, the sun gear 9 is almost non-movable in the direction of the rotation axis L. One end part of a second output shaft (not shown) rotatably supported by the supporting part 2*c* of the carrier 2 is non-rotatably connected to the inner periphery of the sun gear 9. The other end part of the second output shaft projects to the outside from the apparatus main body 1 so as to be connected to, for example, the other of the left and right wheels of a vehicle or the other of the front differential gear and the rear differential gear of a vehicle.

The spacer 10 has a cylindrical configuration. The outside diameter of the spacer 10 is generally equal to the inside diameter of the reduced-diameter part 2*a*. Accordingly, the outer peripheral surface of the spacer 10 is fitted to the inner peripheral surface of the carrier 2 almost with no space. By this, of the entire inner opening part of the receiving hole 2*d*, the left end part opposing the spacer 10 is closed. Moreover, a recess 10*a* is formed in the outer peripheral surface of the spacer 10 at the same location as the receiving hole 2*d* in the peripheral direction. This recess 10*a* has the same center of curvature as the center of the receiving hole 2*d* and it has the same radius of curvature as the radius of the receiving hole 2*d*. As a result, the recess 10 a constitutes a part of the receiving hole 2*d*, i.e., a part of the receiving hole 2*d* as an inner part than the inner peripheral surface of the carrier 2. Accordingly, a side part on the inner periphery side of the left end part of the planetary gear 4 is fitted to the recess 10*a*. The planetary gear 4 enters the inside of the recess 10*a*, thereby the spacer 10 is non-rotatably connected to the carrier 2 through the planetary gear 4. The spacer 10 may be non-rotatably connected directly to the carrier 2.

The inner gear 5 and the sun gear 9 are in engagement with the planetary gears 4, respectively. Accordingly, when the apparatus main body 1 is driven for rotation, the inner gear 5 and sun gear 9 are rotated about the rotation axis L. In this case, the inner gear 5 and sun gear 9 are rotated at the same speed when the planetary gears 4 are not rotated about their own axes and differentially rotated when the planetary gears 4 are rotated about their own axes. As mentioned above, the rotation of the inner gear 5 is transmitted, through the first output shaft, to one of the left and right vehicle wheels or to one of the front differential gear and the rear differential gear, while the rotation of the sun gear 9 is transmitted, through the second output shaft, to the other left or right vehicle wheel or to the other front or rear differential gear, The inner gear 5 is in engagement with a left end part of the planetary gear 4. On the other hand, the sun gear 9 is in engagement with a right end part of the planetary gear 4. The engagement part of the inner gear 5 with respect to the planetary gear 4 and the engagement part of the sun gear 9 with respect to the planetary gear 4 are mutually displaced in the direction of the rotation axis L so that the engagement parts are not overlapped with each other in the direction of the rotation axis L. In this case, the two engagement parts may be displaced in the direction of the rotation axis L so that a space is formed between the engagement part of the inner gear 5 with respect to the planetary gear 4 and the sun gear 9 with respect to the planetary gear 4. Preferably, the two engagement parts are displaced such that the two engagement parts, i.e., a right end part of the engagement part between the inner gear 5 and the planetary gear 4 and a left end part of the engagement part between the sun gear 9 and the planetary gear 4 are located nearly at the same position in the direction of the rotation axis L. The inner gear 5 is in engagement with the planetary gear 4 at its outer side, while the sun gear 9 is in engagement with the planetary gear 4 at its inner side. Accordingly, when the apparatus main body 1 is driven for rotation, the left end part of the planetary gear 4 is urged radially inward of the apparatus main body 1 due to its engagement with the inner gear 5, and the right end part of the planetary gear 4 is urged outward of the apparatus main body 1 due to its engagement with the sun gear 9.

In the planetary gear apparatus A constructed in the manner as mentioned above, when the apparatus main body 1 is driven for rotation, as mentioned above, the end part on the inner gear 5 side (left end part in FIG. 1, hereinafter referred to as the left end part) of the planetary gear 4 is urged radially inward of the apparatus main body 1 by the reaction force of engagement of the planetary gear 4 with the inner gear 5. On the other hand, the end part on the sun gear 9 side (hereinafter referred to as the right end part) of the planetary gear 4 is urged radially outward of the apparatus main body 1 by the reaction force of the engagement of the planetary gear 4 with the sun gear 9. Since the engagement part of the inner gear 5 with the planetary gear 4 and the engagement part of the sun gear 9 with the planetary gear 4 are displaced in the direction of the rotation axis L without being overlapped with each other, The planetary gear 4 receives a rotational moment (hereinafter referred to as the cocking moment) directing counterclockwise in FIG. 1. about the central part between the engagement part of the planetary gear 4 with the inner gear 5 and the engagement part of the planetary gear 4 with the sun gear 9. By this cocking moment, the planetary gear 4 is slanted such that the left end part of the planetary gear 4 moves radially inward of the apparatus main body 1 and the right end part moves radially outward. As a result, the outer peripheral surface of the planetary gear 4 is not contacted with the inner peripheral surface of the receiving hole 2*d* over its entire area, but only the inner side part of a left end edge part and the outer side part of the right end edge part are press-contacted with the inner peripheral surface of the receiving hole 2*d*. More specifically, the inner side part of the left end edge part is press-contacted with the bottom surface of the recess 10*a* which forms an inside part of the receiving hole 2*d*, and the outer side part of the right end edge part is press-contacted with the outer side part of the inner peripheral surface of the receiving hole 2*d*. Thus, when the planetary gear 4 is rotated about its own axis at the time of differential rotation of the planetary gear apparatus A, a frictional torque for prohibiting the rotation of the planetary gear 4 is generated between the planetary gear 4 and the inner peripheral surface of the receiving hole 2*d* (and the wall surface of the recess 10*a*). This frictional torque is, by far, greater than the frictional force which is generated when the outer peripheral surface of the planetary gear 4 is contacted with the inner peripheral surface of the receiving hole 2*d* over its entire area. Accordingly, a large torque bias ratio can be obtained.

As apparent from the foregoing, in the planetary gear apparatus A of this embodiment, the recess 10*a* serves as a first supporting part for supporting the engagement part of the planetary gear 4 with respect to the inner gear 5 from the inside, while the outer side part of that part of the receiving hole 2*d* corresponding to the enlarged-diameter part 1*b* serves as a second supporting part for supporting the engagement part of the planetary gear 4 with respect to the sun gear 9 from the outside.

Figure 5:
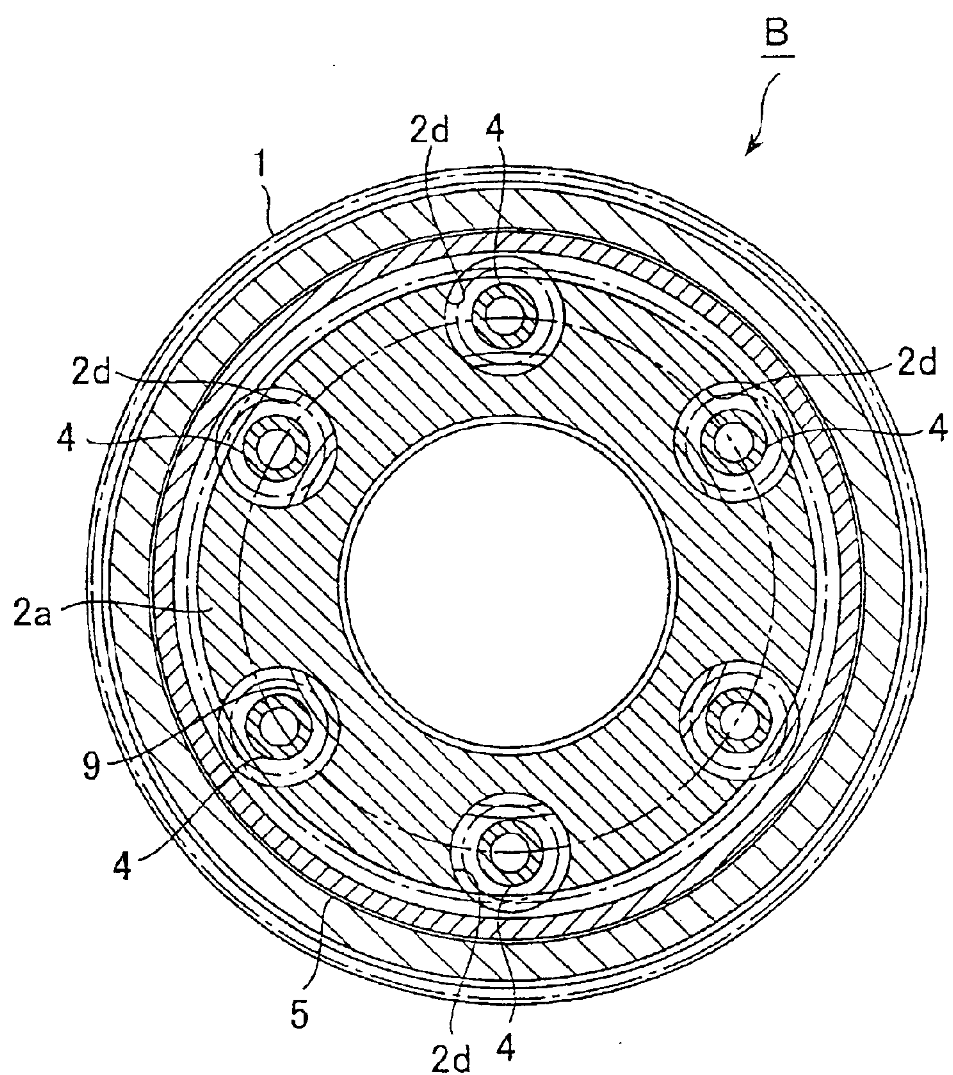
FIG. 5 is a sectional view taken on line X—X of FIG. 4.

FIGS. 4 and 5 show another embodiment of the first invention. In a planetary gear apparatus B of this embodiment, the sun gear 9 can be inserted into the carrier 2 through an opening part of the supporting part 2*c*. That is, in the above-mentioned planetary gear apparatus A, since the inside diameter of the supporting part 2*c* is smaller than the outside diameter of the sun gear 9, the sun gear 9 cannot be inserted into the carrier 2 from the supporting part 2*c* side. In order to avoid this inconvenience, the inside diameters of the reduced-diameter part 2*a* and enlarged-diameter part 2*b* of the carrier 2 are set to be equal to or larger than the outside diameter of the sun gear 9, and the sun gear 9 is inserted into the carrier 2 through the opening part of the reduced-diameter part 2*a*. Since the inside diameter of the reduced-diameter part 2*a* is set to be larger than the outside diameter of the sun gear 9, the inner side part of the left end part of the receiving hole 2*d* is open radially inward of the apparatus main body 1 and the inner side part of the left end part of the receiving hole 2*d* is formed of the recess 10*a*.

However, in the planetary gear apparatus B of this embodiment, the inside diameter of the supporting part 2*c* is set to be slightly larger than the outside diameter of the sun gear 9, and the sun gear 9 is inserted into the carrier 2 through the opening part of the supporting part 2*c*. Accordingly, the inside diameter of the reduced-diameter part 2*a* can be set to be smaller than the outside diameter of the sun gear 9. In this embodiment, the inside diameter of the reduced-diameter part 2*a* is set to be equal to the inside diameter of the spacer 10 of the planetary gear apparatus A. Thus, the side part on the inner peripheral side of the receiving hole 2*d* corresponding to the enlarged-diameter part 2*b*, is open radially inward of the apparatus main body 1 but the side part on the inner peripheral side of the receiving hole 2*d* corresponding to the reduced-diameter part 2*a* is closed by the inner peripheral surface of the reduced-diameter part 2*a*. The side part on the inner peripheral side of the receiving hole 2*d* at the reduced-diameter part 2*a* is integrally formed with the remaining part of the receiving hole 2*d*. Since the inside diameter of the reduced-diameter part 2*a* is set to be smaller than the inside diameter of the enlarged-diameter part 2*b*, an annular stepped-surface 2*e* is formed between the inner peripheral surface of the reduced-diameter part 2*a* and the inner peripheral surface of the enlarged-diameter part 2*b*. This stepped-surface 2*e* is in contact with a left end face of the sun gear 9. Since the inside diameter of the supporting part 2*c* is set to be larger than the outside diameter of the sun gear 9, the outside diameter of the washer 11 on the supporting part 2*c* side of all the two friction washers 11, 11 is dimensioned to be large so that it can be contacted with the inner end face of the supporting part 2*c*.

All the remaining construction of the planetary gear apparatus B is the same as the construction of the above-mentioned planetary gear apparatus A, and operation and effect thereof are also the same as that of the planetary gear apparatus A.

In the planetary gear apparatuses A, B, the teeth of the planetary gear 4, inner gear 5 and sun gear 9 have helical teeth. The reason for employment of the helical teeth is as follows. The engagement of the planetary gear 5 with the inner gear 5 and sun gear 9 generates a thrust force, which acts in the direction parallel to the rotation axis L, to the gears 4, 5 and 9. The end faces of the gears 4, 5 and 9 are contacted with the friction washers 6, 7, 11 by this thrust force. Further, the end faces of the gears 4, 5 and 9 are contacted with the apparatus main body 1 or the carrier 2 through the friction washers 6, 7, 11. This generates a friction torque, which prohibits their rotation, to the end faces of the gears 4, 5 and 9. By this, the torque bias ratio is set to be large.

In case the gears 4, 5 and 9 having helical teeth are employed, the engaging positions of the planetary gear 4 with respect to the inner gear 5 and sun gear 9 are cyclically changed in the direction of the rotation axis L for each rotation of one tooth of the planetary gear 4. As a result, the magnitude of the cocking moment is cyclically changed. As the cyclical change of the magnitude of the cocking moment is progressed, the torque bias ratio (torque bias ratio attributable to contact of the outer peripheral surface of the planetary gear 4 with respect to the inner peripheral surface of the receiving hole 2*d* of all the torque bias ratios) is cyclically changed. Presuming here that the rotational phases of all planetary gears 4 are equal, the torque bias ratio is changed at the same phase. As a result, the following equation is established;

$$M=m\times n$$

wherein the amount of fluctuation of the torque bias ratio by all planetary gears 4 is M, the amount of fluctuation of the torque bias ratio by the individual planetary gears 4 is m and the number of the planetary gears 4 is n. The fluctuating amount M of the torque bias ratio by all planetary gears 4 is multiplied by the number of the planetary gears 4 with respect to the fluctuating amount m of the torque bias ratio of the individual planetary gears 4. As the fluctuating amount of the torque bias ratio is increased, there is possibility that the planetary gear apparatuses A, B are vibrated and large noises are generated.

In order to prevent such an inconvenience from occurring, the engaging phase of at least one planetary gear 4 with respect to the inner gear 5 and sun gear 9 may be made different from the engaging phase of any remaining planetary gear 4 with respect to the inner gear 5 and sun gear 9. By doing so, the cocking moment acting on at least one planetary gear 4 is not simply added to the cocking moment which acts on any remaining planetary gear 4. Instead, the cocking moments are averaged or offset, so that the amount of fluctuation of the torque bias ratio can be reduced. Three examples will be shown hereinafter in which the engaging phase of at least one planetary gear 4 with respect to the inner gear 5 and sun gear 9 is made different from the engaging phase of any remaining planetary gear 4 with respect to the inner gear 5 and sun gear 9.

In the first example, as in the planetary gear apparatuses A and B, a plurality of planetary gears 4 are equidistantly arranged in the peripheral direction. If the number of teeth of the planetary gear 4, inner gear 5 and sun gear 9 is represented by N1, N2 and N3, respectively,
the following equation (1) must be satisfied;

$$N2=2\cdot N1+N3 \tag{1}$$

In addition, the number of teeth N1, N2 and N3 must be deliberately selected in order to satisfy the condition that the number of installation n is different from a divisor of N2 and N3.

That is, the engaging phase of the planetary gear 4 with respect to the inner gear 5 and sun gear 9 is fluctuated at the cycle of (360 degrees/N1). On the other hand, if the number of teeth of the inner gear 5 and sun gear 9 located between the peripherally adjacent two planetary gears 4 and 4 is represented by T1 and T2, respectively, the engaging phases of the two planetary gears 4, 4 with respect to the inner gear 5 become different from each other by (360 degrees/N1)×T1, while the engaging phases of the two planetary gears 4, 4 with respect to the sun gear 9 become different from each other by (360 degrees/N1)×T2. If the number of teeth T1 and T2 are integers, the engaging phases of the peripherally adjacent two planetary gears 4, 4 with respect to the sun gear 9 become an integral multiple of the cycle (360 degrees/N1). Therefore, the engaging phases of the peripherally adjacent two planetary gears 4, 4 with respect to the inner gear 5 and sun gear 9 become substantially identical, and all planetary gears 4 are engaged with the inner gear 5 and sun gear 9 substantially at the identical phases.

In other words, if the number of teeth T1, T2 are figures having a fraction below the decimal point, the engaging phases of the peripherally adjacent two planetary gears 4, 4 with respect to the inner gear 5 become different from each other, and the engaging phases of the peripherally adjacent two planetary gears 4, 4 with respect to the sun gear 9 become different from each other. The reason is as follows. In case the number of teeth T1, T2 have a fraction below the decimal point, the engaging phases (360 degrees/N1)×T1, (360 degrees/N1)×T2 of the peripherally adjacent two planetary gears 4, 4 with respect to the inner gear 5 and sun gear 9 do not become an integral multiple of the cycle (360 degrees/N1) of the engaging phase of the planetary gear 4. So, the number of teeth T1, T2 are to be checked hereinafter. Since the planetary gears 4 are equidistantly arranged in the peripheral direction of the apparatus main body 1, the following equations are established.

$$T1=N2/n$$

$$T2=N3/n$$

Here, the number of installation n of the planetary gears 4 is not a divisor of the number of teeth N2 and N3 of the inner gear 5 and sun gear 9 as mentioned above with reference to the original conditions. Therefore, the number of teeth T1 and T2 have a fraction below the decimal point which is not an integer. Thus, the engaging phases of the peripherally adjacent two planetary gears 4, 4 with respect to the inner gear 5 and sun gear 9 become different from each other and the engaging phases of all planetary gears 4 with respect to the inner gear 5 and sun gear 9 become different from each other. If the engaging phases are different from each other, the fluctuation of the friction torque acting on the outer periphery of each planetary gear 4 is not doubled. Therefore, the amount of fluctuation of the friction torque acting on all planetary gears 4, i.e., friction torque acting on the planetary gear apparatuses A, B can be reduced, thereby the amount of fluctuation of the torque bias ratio can be reduced.

The above will be described in more detail with concrete values. In the example, the number of teeth N1, N2 and N3 of the gears 4, 5 and 9 are 7, 37 and 23, respectively. The number of teeth N1, N2 and N3 satisfy the following equation.

$$N1(37)=2\cdot N1(7)+N2 \tag{23}$$

6 is adopted as the number of installation n of the planetary gears 4. Therefore, the number of teeth T1 and T2 of the inner gear 5 and sun gear 9 located between the peripherally adjacent two planetary gears 4 and 4 satisfy the following equations.

$$T1=N2/N1=37/6\approx 6.2$$

$$T2=N3/N1=23\ 6\approx 3.8$$

The number of teeth T1 and T2 are not integers. Instead, they have a faction below the decimal point. Thus, the engaging phases of the planetary gears 4 with respect to the inner gear 5 can be made different from one another. Also, the engaging phases of the planetary gears 4 with respect to the sun gear 9 can be made different from one another.

The engaging phase differences of the planetary gears 4 with respect to the inner gear 5 and sun gear 9 will be described in more detail. Since the number of teeth N1 of the planetary gear 4 is 7, the engaging cycle (fluctuating cycle of the friction torque) of the planetary gear 4 with respect to the inner gear 5 and sun gear 9 is as follows.

$$360\text{ degrees}/7\approx 51.4\text{ degrees}$$

On the other hand, the engaging phases of the peripherally adjacent two planetary gears 4, 4 with respect to the inner gear 5 and sun gear 9 are, respectively, as follows.

$$(360\text{ degrees}/7)\times T1\approx 317.1\text{ degrees}$$

$$(360\text{ degrees}/7)\times T2\approx 197.1\text{ degrees}$$

Since the engaging cycle of the planetary gear 4 is 51.4 degrees here, the substantial engaging phase differences (minimum values of the engaging phase differences) of the peripherally adjacent two planetary gears 4, 4 with respect to the inner gear 5 and sun gear 9 are as follows.

$$317.1\text{ degrees}-51.4\text{ degrees}\times 6=8.6\text{ degrees}$$

$$197.1\text{ degrees}-51.4\text{ degrees}\times 4=-8.7\text{ degrees}$$

The difference of the above values 8.6 and 8.7 is an error occurred because the number two positions below the decimal point is rounded.

FIG. 6 shows the fluctuation of the friction torque upto the respective planetary gears PG1 through PG6 and the fluctuation of the friction torque of the entire planetary gears PG1 through PG6 when an optional planetary gear 4 out of 6 planetary gears 4 serves as a reference planetary gear PG1 and the respective planetary gears sequentially arranged in the peripheral direction of the carrier 2 from this reference planetary gear PG1 are represented by PG2, PG3, , respectively. In this example, since the friction torques acting on the respective planetary gears PG1 through PG6 are offset, the fluctuation of the friction torque as the entire planetary gears PG1 through PG6 theoretically becomes zero.

The interval (center angle) between the peripherally adjacent planetary gears 4, 4 is required to be selected from values which are integral multiples of m in case m=360 degrees/(N2+N3). In this example, since N=37 and N3=23, m=6 degrees and the center angle between the adjacent two planetary gears 4, 4 is 360 degrees/6=60 degrees. This is ten times of m=6 degrees and an integral multiple. Therefore, this example satisfies the above conditions. The examples to be described hereinafter are also required to satisfy the above conditions.

Figure 7:
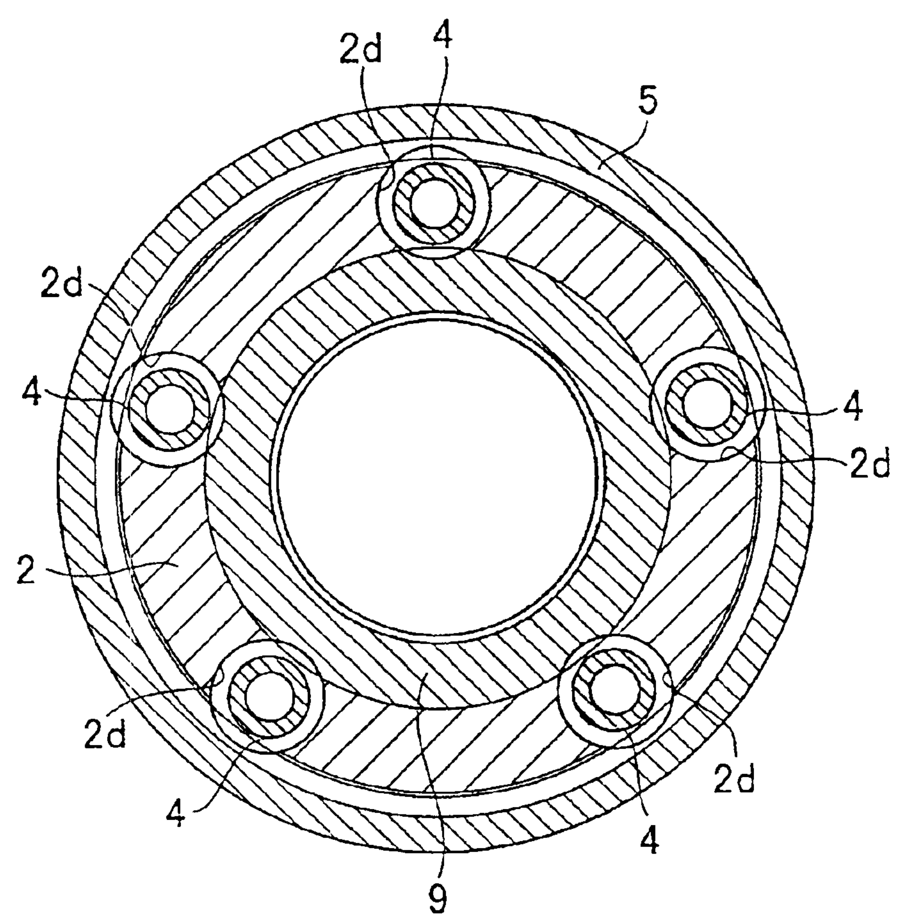
FIG. 7 is a sectional view similar to FIG. 2 when other predetermined conditions are satisfied in the embodiment of the first invention, in which an apparatus main body is omitted.

A second example shown in FIG. 7 will be described next. In this example, the same conditions as in the above first example are satisfied. That is, a plurality of planetary gears 4 are equidistantly arranged in the peripheral direction and if the number of teeth of the planetary gears 4, inner gear 5 and sun gear 9 are represented by N1, N2 and N3, respectively, the following equation is satisfied.

$$N2=2\cdot N+N3$$

In addition, it is satisfied such a condition that a number different from a divisor of the number of teeth N2 of the inner gear 5 and the number of teeth N3 of the sun gear 8 is adopted as the number of installation n of the planetary gear 4. However, concrete values are different from those in the above first example.

That is, 5 is adopted as the number of installation n of the planetary gear 4, and 6, 36 and 24 are adopted as the number of teeth N1 of the planetary gear 4, the number of teeth N2 of the inner gear 5 and the number of teeth N3 of the sun gear 9, respectively. Therefore, the engaging cycle of the planetary gear 4 is as follows.

$$360\ \text{degrees}/6=60\ \text{degrees}.$$

And the number of teeth T1 and T2 are as follows.

$$T1=36/5=7.2$$

$$T2=24/5=4.8$$

The engaging phase differences of the peripherally adjacent two planetary gears 4, 4 with respect to the inner gear 5 and sun gear 9 are, respectively, as follows.

$$(360\ \text{degrees}/6)\times T1=432\ \text{degrees}$$

$$(360\ \text{degrees}/6)\times T2=288\ \text{degrees}$$

Since the engaging cycle of the planetary gear 4 is 60 degrees here, the substantial engaging phase difference (minimum value of the engaging phase difference) of the peripherally adjacent two planetary gears 4, 4 with respect to the inner gear 5 and sun gear 9 is as follows.

$$432\ \text{degrees}-60\ \text{degrees}\times 7=12\ \text{degrees}$$

$$288\ \text{degrees}-60\ \text{degrees}\times 5=-12\ \text{degrees}$$

Figure 8:
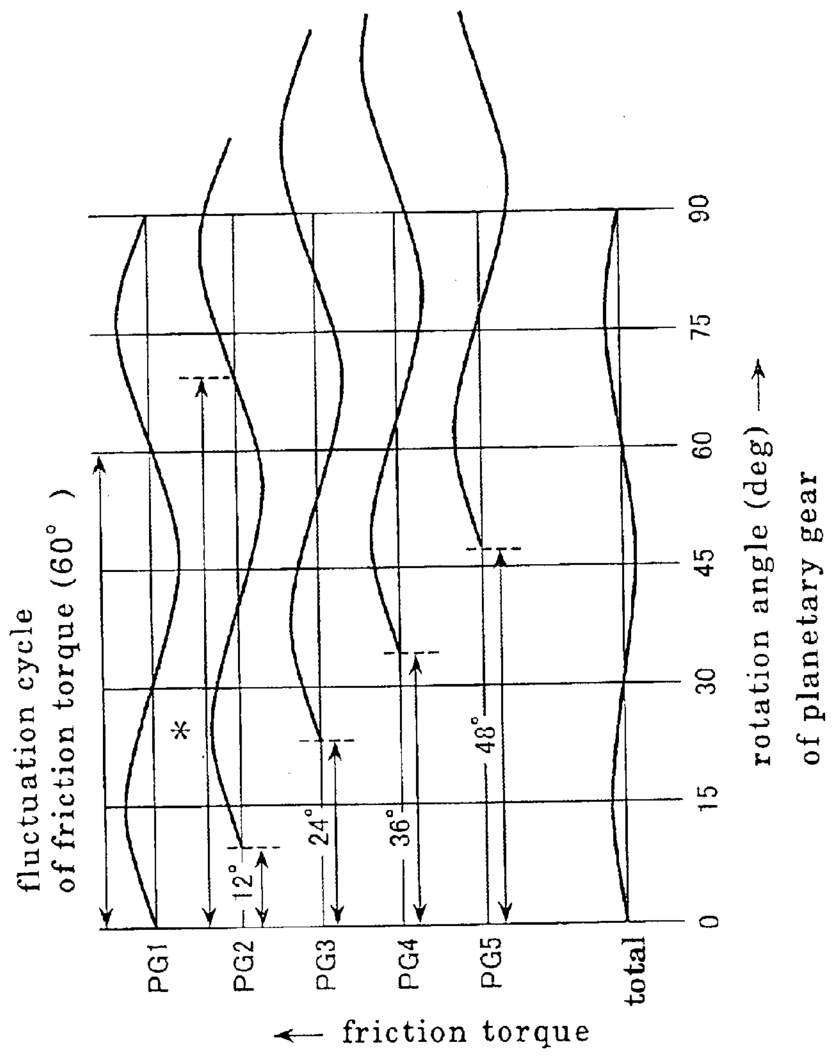
FIG. 8 is a chart showing fluctuation of the friction torque which acts on each planetary gear and of the total friction torque which acts on all of the planetary gears in the embodiment shown in FIG. 7.

FIG. 8 shows the fluctuation of the friction torque of the respective planetary gears PG1 through PG5 and the fluctuation of the friction torque of the entire planetary gears PG1 through PG5 according to the second example. In this example, the fluctuation of the friction torque of the entire planetary gears PG1 through PG5 according to the second example can theoretically be made zero.

FIG. 9 shows the third example for making small of the fluctuation of the torque bias ratio. In this example, 6 is adopted as the number of installation n of the planetary gear 4, and 6, 36 and 24 are adopted as the number of teeth N1 of the planetary gear 4, the number of teeth N2 of the inner gear 5 and the number of teeth N3 of the sun gear 9, respectively. Therefore, if the respective planetary gears 4 should be equidistantly arranged in the peripheral direction, the number of teeth T1 and T2 of the inner gear 5 and sun gear 9 located between the peripherally adjacent two planetary gears 4, 4 would become 6, 4, respectively and have no fraction below the decimal point, thus making it unable to reduce the amount of fluctuation of the torque bias ratio. So, in this example, the amount of fluctuation of the torque bias ratio is reduced by arranging the respective planetary gears 4 in such a manner as to satisfy the following relation.

That is, the respective planetary gears 4 are arranged such that the center angles between the adjacent two planetary gears 4, 4 become α and β alternately. In case k is a plus integer, the angles α and β are determined by the following equations.

$$\alpha=(360\ \text{degrees}/n)+k\cdot 360\ \text{degrees}\ (N2+N3)$$

$$\beta=(360\ \text{degrees}/n)-k\cdot 360\ \text{degrees}\ (N2+N3)$$

Since the angles α and β are as follows, $$\alpha+\beta=(360\ \text{degrees}/n)\times 2$$

if 6 planetary gears 4 are represented by PG1 through PG6, the engaging phases of the planetary gears PG1, PG3 and PG5 are identical, and the engaging phases of the planetary gears PG2, PG4 and PG6 are identical.

However, if the number of teeth of the inner gear 5 and sun gear 9 located between the peripherally adjacent two planetary gears PG1, PG2; PG3, PG4; and PG5, PG6 are represented by T3 and T4, respectively, the following equations can be obtained.

$$T3=(360\ \text{degrees}/\alpha)\times N2$$

$$T4=(360\ \text{degrees}/\alpha)\times N3$$

And the integer k is selected so that the number of teeth T3 and T4 have a fraction below the decimal point. Therefore, in this example, the engaging phases of the planetary gears PG1, PG3 and PG5 can be made different from the engaging phases of the remaining planetary gears PG2, PG4 and PG6, thereby the amount of fluctuation of the torque bias ratio can be reduced.

The above will be described in more detail with concrete values. In this example, k=1 is adopted. Therefore, α=66 degrees and β=54 degrees. The number of teeth T3 and T4 of the inner gear 5 and sun gear 9 located within the angle α are 6.6 and 4.4, respectively. The engaging phase differences of the planetary gears PG2, PG4 and PG6 with respect to the planetary gears PG1, PG3 and PG5 with the number of teeth T3 and T4 are as follows.

$$(360\ \text{degrees}/6)\times 6.6=396\ \text{degrees}$$

$$(360\ \text{degrees}/6)\times 4.4=264\ \text{degrees}$$

Since the engaging cycle of the planetary gear 4 is as follows, $$360\ \text{degrees}/6=60\ \text{degrees}$$

the following equations can be obtained.

$$396\ \text{degrees}-60\ \text{degrees}\times 6=36\ \text{degrees}$$

$$264\ \text{degrees}-60\ \text{degrees}\times 5=-36\ \text{degrees}$$

That is, there is substantially a difference of 36 degrees between the engaging phases of the planetary gears PG1, PG3 and PG5 with respect to the inner gear 5 and sun gear 9 and the engageing phases of the planetary gears PG2, PG4 and PG6 with respect to the inner gear 5 and sun gear 9.

Figure 10:
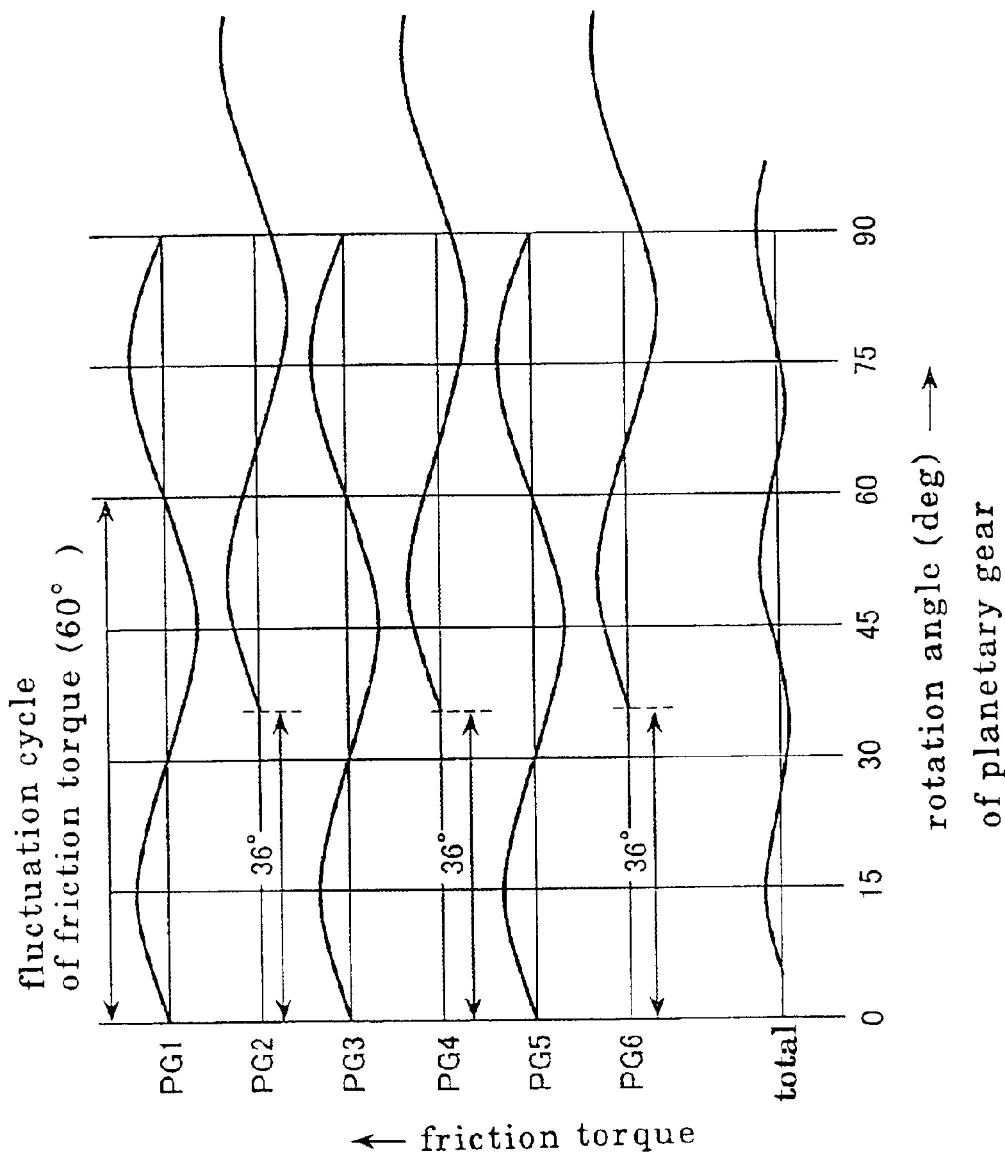
FIG. 10 is a chart showing fluctuation of the friction torque which acts on each planetary gear and of the total friction torque which acts on all of the planetary gears in the embodiment shown in FIG. 9.

FIG. 10 shows the friction torque acting on the planetary gears PG1 through PG 6 in the above example and the total friction torque obtained by adding the friction torque acting on the respective planetary gears PG1 through PG6. As apparent from this Figure, merely by dividing 6 planetary gears 4 into two groups having different engaging phases. So, the total friction torque cannot be made substantially zero unlike the above-mentioned example, but the amount of fluctuation of the total friction torque can be reduced compared with a case where the engaging phases of all planetary gears 4 are identical.

Figure 11:
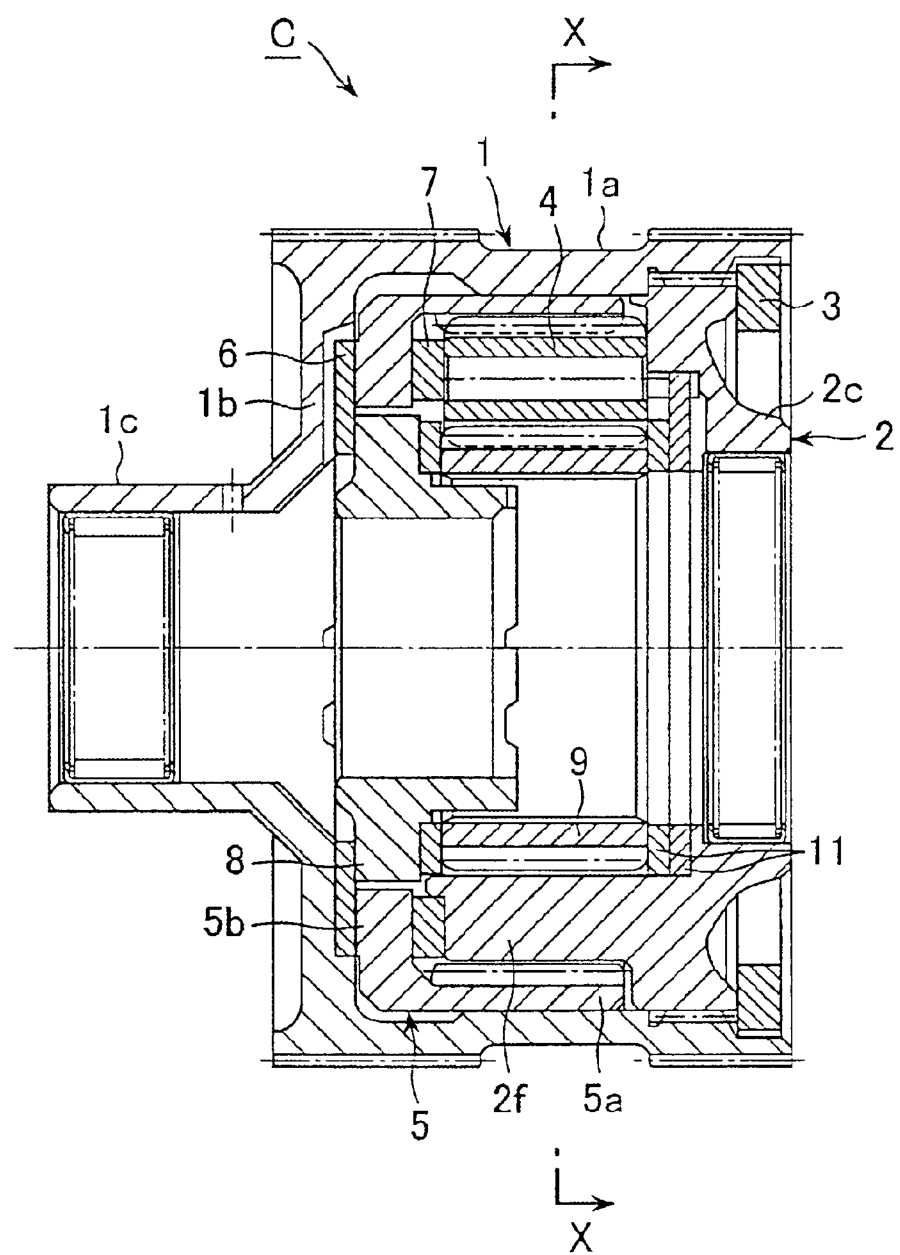
FIG. 11 is a sectional view similar to FIG. 1 showing one embodiments according to the second and third inventions.
Figure 12:
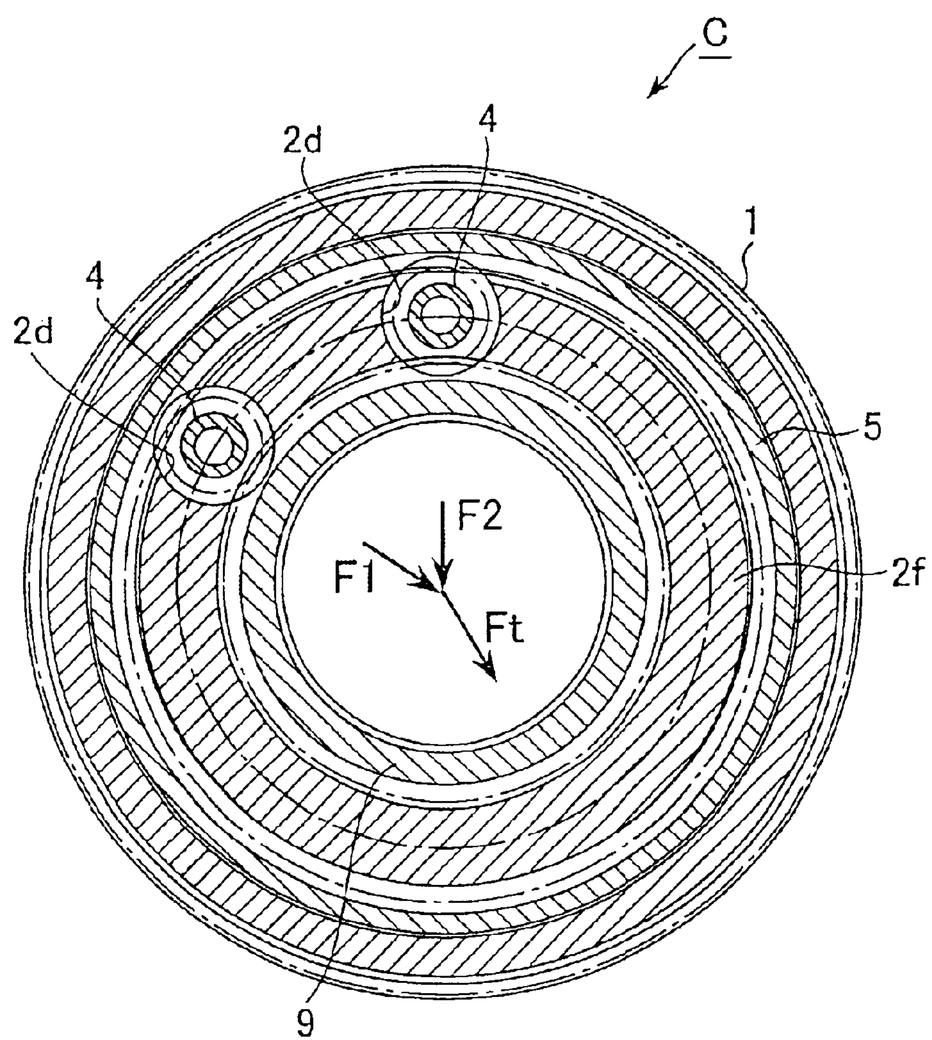
FIG. 12 is a sectional view taken on line X—X of FIG. 11.

FIGS. 11 and 12 show one embodiments according to the second and third inventions. In a planetary gear apparatus C of this embodiment, a circular cylindrical part 2*f*, instead of the reduced-diameter part 2*a* and the enlarged-diameter part 2*b*, is formed on the carrier 2. The circular cylindrical part 2*f* has the same inside and outside diameters as the reduced-diameter part 2*a*. Accordingly, the receiving hole 2*d* is open at the outer peripheral surface and the inner peripheral surface of the circular cylindrical surface 2*f*. The inner gear 5 is in engagement with the planetary gear 4 at the outer opening part of the receiving hole 2*d*. The sun gear 9 is in engagement with the planetary gear 4 at the inner opening part of the receiving hole 2*d*. The engagement part between the inner gear 5 and the planetary gear 4 and the engagement part between the sun gear 9 and the planetary gear 4 are located generally at the same position in the direction of the rotation axis L.

The inner gear part 5*a* of the inner gear 5 is rotatably fitted to the inner peripheral of the apparatus main body 1 but with almost no space. On the other hand, the sun gear 9 is rotatably fitted to the inner peripheral surface of the circular cylindrical part 2*f* of the carrier 2 but with almost no space.

In this planetary gear apparatus C, as shown in FIG. 12, two planetary gears 4 are used. The two planetary gears 4, 4 are non-equidistantly arranged in the peripheral direction of the carrier 2 so that the force F1 for causing one of the planetary gears 4 to urge the sun gear 9 in its radial direction and the force F2 for causing the other planetary gear 4 to urge the sun gear 9 in its radial direction are not offset and the resultant force Ft of the forces F1 and F2 urges the sun gear 9 radially in one direction. 3 or more planetary gears 4 may be employed as long as it can satisfy the conditions that the forces for urging the sun gear 9 in its radial direction are not offset and the resultant force urges the sun gear 9 radially in one direction. The two planetary gears 4, 4 urge the inner gear 5 in the direction opposite to the direction of the reaction force of the resultant force Ft for urging the sun gear 9. In other words, the planetary gears 4, 4 urge the inner gear 5 radially in one direction by a resultant force which is identical in magnitude to the resultant force Ft but which acts in the opposite direction.

The sun gear 9 urged by the resultant force Ft is received by the inner peripheral surface 3*f* of the circular cylindrical part 2*f* of the carrier 2 which is located at a forward position in the acting direction of the resultant force Ft. On the other hand, the inner gear 5 urged by the force which acts in the direction opposite to the direction towards which the resultant force Ft acts is received by the inner peripheral surface of the main body part 1*a* of the apparatus main body 1 which is located in the opposite direction to the direction toward which the resultant force Ft acts. Accordingly, in the planetary gear apparatus C of this embodiment, the circular cylindrical part 2*f* of the carrier 2 serves also as a sun gear supporting member, and the main body part 1*a* of the apparatus main body 1 also serves as an inner gear supporting member. All the remaining construction is same as the above-mentioned planetary gear apparatuses A and B.

In the planetary gear apparatus C constructed in the manner as mentioned above, the outer peripheral surface of the sun gear 9 is urged against the inner peripheral surface of the circular cylindrical part 2*f* of the carrier 2 by the resultant force Ft. and the outer peripheral surface of the inner gear 5 is urged against the inner peripheral surface of the main body part 1*a* of the apparatus main body 1 by the urging force directing toward the opposite direction to the resultant force Ft. Accordingly, at the time of differential rotation, a friction torque for prohibiting the rotation of the sun gear 9 acts on the outer peripheral surface of the sun gear 9, and a friction torque for prohibiting the rotation of the inner gear 5 acts on the outer peripheral surface of the inner gear 5. By this, the torque bias ratio can be increased.

What is claimed is:

1. A planetary gear apparatus comprising an inner gear and a sun gear which are rotatably arranged with axes thereof aligned with a rotation axis, at least one planetary gear arranged in parallel with said inner gear and sun gear and engaged therewith, and a carrier rotatably arranged with an axis thereof aligned with said rotation axis and formed therein with a receiving hole for rotatably receiving said planetary gear over a generally entire length thereof, an engagement part between said inner gear and said planetary gear are displaced with an engagement part between said sun gear and said planetary gear in a direction of said rotation axis so that said engagement parts are not overlapped with each other.

2. A planetary gear apparatus according to claim 1, wherein said engagement part between said inner gear and said planetary gear and said engagement part between said sun gear and said planetary gear are displaced such that end parts of said engagement parts which are adjacent to each other in a direction of said rotation axis are located nearly at the same position in a direction of said rotation axis.

3. A planetary gear apparatus according to claim 1, further comprising a first supporting part for supporting an outer peripheral surface of said planetary gear corresponding to said engagement part between said inner gear and said planetary gear from an inner side than the planetary gear in a radial direction of said inner gear, and a second supporting part for supporting an outer peripheral surface of said planetary gear corresponding to said engagement part between said sun gear and said planetary gear from an outer side than said planetary gear in a radial direction of said sun gear.

4. A planetary gear apparatus according to claim 1, wherein said inner gear, said sun gear and said planetary gear each have helical teeth, a plurality of said planetary gears are provided, an engaging phase of said at least one planetary gear with respect to said inner gear and sun gear is different in phase from an engaging phase of another planetary gear with respect to said inner gear and sun gear.

5. A planetary gear apparatus comprising an inner gear and a sun gear which are rotatably arranged with axes thereof aligned with a rotation axis, and a plurality of planetary gears engaged with said inner gear and sun gear, said planetary gears are arranged at non-uniform interval in a peripheral direction of said sun gear so that when said planetary gears urge said sun gear in the radial direction by engagement with said sun gear, a resultant force of the urging force acts in one direction in a radial direction of said sun gear, and a sun gear supporting member for supporting an outer peripheral surface of said sun gear is disposed at the outside of said sun gear on a forward side in said one direction.

6. A planetary gear apparatus comprising an inner gear and a sun gear which are rotatably arranged with axes thereof aligned with a rotation axis, and a plurality of planetary gears engaged with said inner gear and sun gear, said planetary gears are arranged at non-uniform interval in a peripheral direction of said inner gear so that when said planetary gears urge said inner gear in the radial direction by engagement with said inner gear, a resultant force of the urging force acts in one direction in a radial direction of said inner gear, and an inner gear supporting member for supporting an outer peripheral surface of said inner gear is disposed at the outside of said inner gear on a forward side in said one direction.

* * * * *